US008516084B1

(12) United States Patent
Grieve

(10) Patent No.: US 8,516,084 B1
(45) Date of Patent: *Aug. 20, 2013

(54) PROCESSING DATA REQUESTS USING MULTIPLE REQUEST TIMERS

(71) Applicant: Google Inc., Mountain View, CA (US)

(72) Inventor: Andrew Grieve, Waterloo, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/645,162

(22) Filed: Oct. 4, 2012

Related U.S. Application Data

(63) Continuation of application No. 12/769,376, filed on Apr. 28, 2010, now Pat. No. 8,307,031.

(51) Int. Cl.
*G06F 15/16* (2006.01)
*G06F 15/173* (2006.01)

(52) U.S. Cl.
USPC ............................ 709/219; 709/224; 709/228

(58) Field of Classification Search
None
See application file for complete search history.

(56) References Cited

U.S. PATENT DOCUMENTS

| 6,526,433 | B1 | 2/2003 | Chang et al. |
| 7,050,940 | B2 | 5/2006 | Basso et al. |
| 7,124,181 | B1 * | 10/2006 | Magdych et al. ............. 709/224 |
| 7,330,894 | B2 | 2/2008 | Vallone |
| 7,493,394 | B2 | 2/2009 | Zavalkovsky et al. |
| 7,954,152 | B2 | 5/2011 | Shiran |
| 8,307,031 | B1 * | 11/2012 | Grieve ........................ 709/203 |

OTHER PUBLICATIONS

U.S. Appl. No. 12/769,376, by Andrew Grieve, filed Apr. 28, 2010.
"Handling timeouts gracefully in AJAX using client-side code," Originally posted without feedback Mar. 7, 2006, 3 pp. http://geekswithblogs.net/lorint/archive/2006/03/07/71625.aspx.
Wikipedia article, "XMLHttpRequest," Feb. 21, 2010, 7 pp. http://en.wikipedia.org/wiki/XMLHttpRequest.
Non-Final Office Action from U.S. Appl. No. 12/769,376, dated Mar. 19, 2012, 9 pp.
Response to Non-Final Office Action from U.S. Appl. No. 12/769,376, filed Jun. 19, 2012, 12 pp.
Notice of Allowance from U.S. Appl. No. 12/769,376, dated Jul. 6, 2012, 5 pages.

* cited by examiner

*Primary Examiner* — John B Walsh
(74) *Attorney, Agent, or Firm* — McDermott Will & Emery LLP

(57) ABSTRACT

The present disclosure relates to techniques for processing data requests using multiple request timers. An example method includes sending a request for data to an external device and starting a first request timer using a first request timeout value, the first request timeout value specifying a first amount of time to wait for receiving data that is responsive to the request. When first data responsive to the request is received prior to expiration of the first request timer, the method includes starting a second request timer using a second request timeout value, the second request timeout value specifying a second amount of time to wait for receiving additional data that is further responsive to the request. The method further includes determining whether the request is unsuccessful based upon expiration of the first request timer or the second request timer.

25 Claims, 6 Drawing Sheets

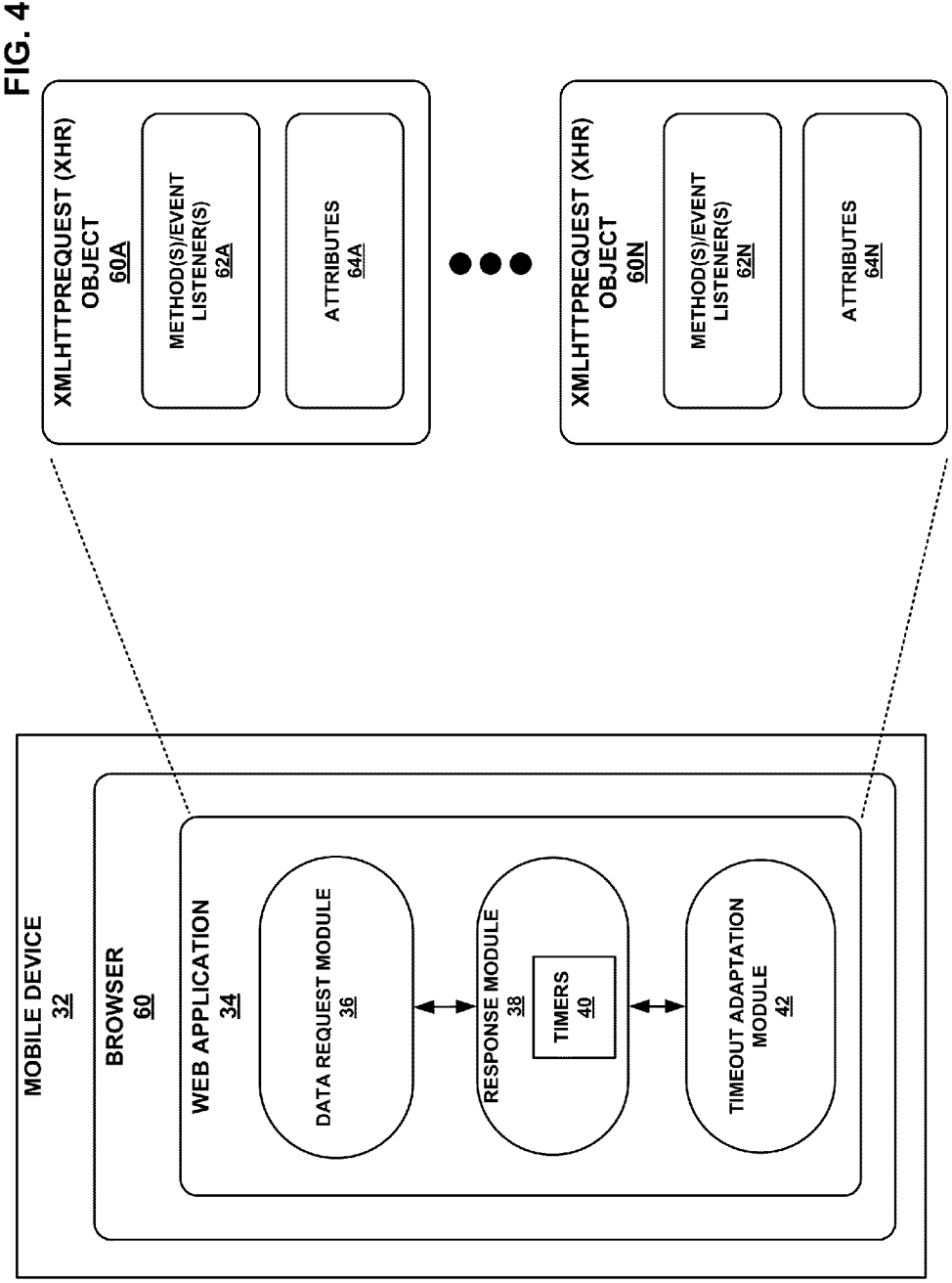

PROCESSING DATA REQUESTS USING MULTIPLE REQUEST TIMERS

This application is a continuation of U.S. application Ser. No. 12/769,376, filed Apr. 28, 2010, the entire content of which is incorporated herein by reference.

TECHNICAL FIELD

This disclosure relates to the processing of data requests by a computing device.

BACKGROUND

In a typical network computing environment, a computing device may communicate with one or more external devices via one or more communication networks. For example, a client device may communicate with a server via a wired or wireless network. In some cases, the network may comprise the Internet and the external devices may comprise web servers.

When communicating with an external server, a client device may send a data request to the server and receive data that is responsive to the request. In many cases, the client device may execute an application or script that sends the request. For example, an Extensible Markup Language Hypertext Transfer Protocol Requests (XMLHttpRequest) is a request object that can be used inside a web browser scripting language, such as JavaScript, to send an HTTP (Hypertext Transfer Protocol) or HTTPS (Hypertext Transfer Protocol Secure) request to a web server, and to then load the server response data back into the script for use. The response data may be usable within the script as both an XML document and as plain text.

Typically, when sending a request to a server, the client device may set a timer having a timeout value to determine whether response data is received from the server prior expiration of the timer. If the timer times out, the client device may assume that the request to the server has failed, and may attempt to re-send the request. JavaScript libraries often utilize a constant timeout value for such a timer in order to detect failed requests.

SUMMARY

The present disclosure relates to techniques for processing network data requests using multiple request timers. For example, certain techniques provide strategies for timing out Extensible Markup Language Hypertext Transfer Protocol Requests (XMLHttpRequests) and utilizing timers that may be restarted each time new data responsive to such requests is received. In some cases, further techniques are provided for adaptively modifying timeout values that are used by these timers based upon actual response times to prior data requests. Any device or system implementing one or more of the techniques disclosed herein may, in various cases, be capable of detecting unsuccessful or failed data requests in a timely fashion, regardless of the size of actual or expected data that is at least partially responsive to these requests. In addition, when adaptively modifying implemented timeout values based upon actual response times to prior data requests, the disclosed techniques may, in various cases, account for variability in the amount of time for successful requests to complete due to various factors such as network quality and/or payload size.

In one example, a method includes sending, from a computing device to an external device, a request for data initiated by a web application, and starting, by the computing device, a first request timer using a first request timeout value, the first request timeout value specifying a first amount of time to wait for receiving data sent from the external device that is responsive to the request. When first data responsive to the request is received prior to expiration of the first request timer, the method includes starting a second request timer using a second request timeout value, the second request timeout value specifying a second amount of time to wait for receiving additional data sent from the external device that is further responsive to the request. The method further includes determining whether the request is unsuccessful based upon expiration of the first request timer or the second request timer.

In one example, a computer-readable storage medium is encoded with instructions that, when executed, cause one or more processors to send, to an external device, a request for data initiated by a web application, and start a first request timer using a first request timeout value, the first request timeout value specifying a first amount of time to wait for receiving data sent from the external device that is responsive to the request. When first data responsive to the request is received prior to expiration of the first request timer, the computer-readable medium is encoded with instructions to start a second request timer using a second request timeout value, the second request timeout value specifying a second amount of time to wait for receiving additional data sent from the external device that is further responsive to the request. The computer-readable medium is further encoded with instructions to determine whether the request is unsuccessful based upon expiration of the first request timer or the second request timer.

In one example, a computing device comprises one or more processors and a data request module operable by the one or more processors to send a request for data to an external device, the request being initiated by a web application. The computing device further comprises means for determining whether the request is unsuccessful based upon expiration of the first request timer or the second request timer, wherein the first request timer has a first request timeout value specifying a first amount of time to wait for receiving data sent from the external device that is responsive to the request, and wherein the second request timer has a second request timeout value specifying a second amount of time to wait for receiving additional data sent from the external device that is further responsive to the request.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a block diagram illustrating one example of the mobile device shown in FIG. 3, which is capable of sending one or more Extensible Markup Language Hypertext Transfer Protocol Requests (XMLHttpRequests) and determining whether any data responsive to these XMLHttpRequests is received, according to one or more aspects of the present disclosure.

DETAILED DESCRIPTION

Figure 1:
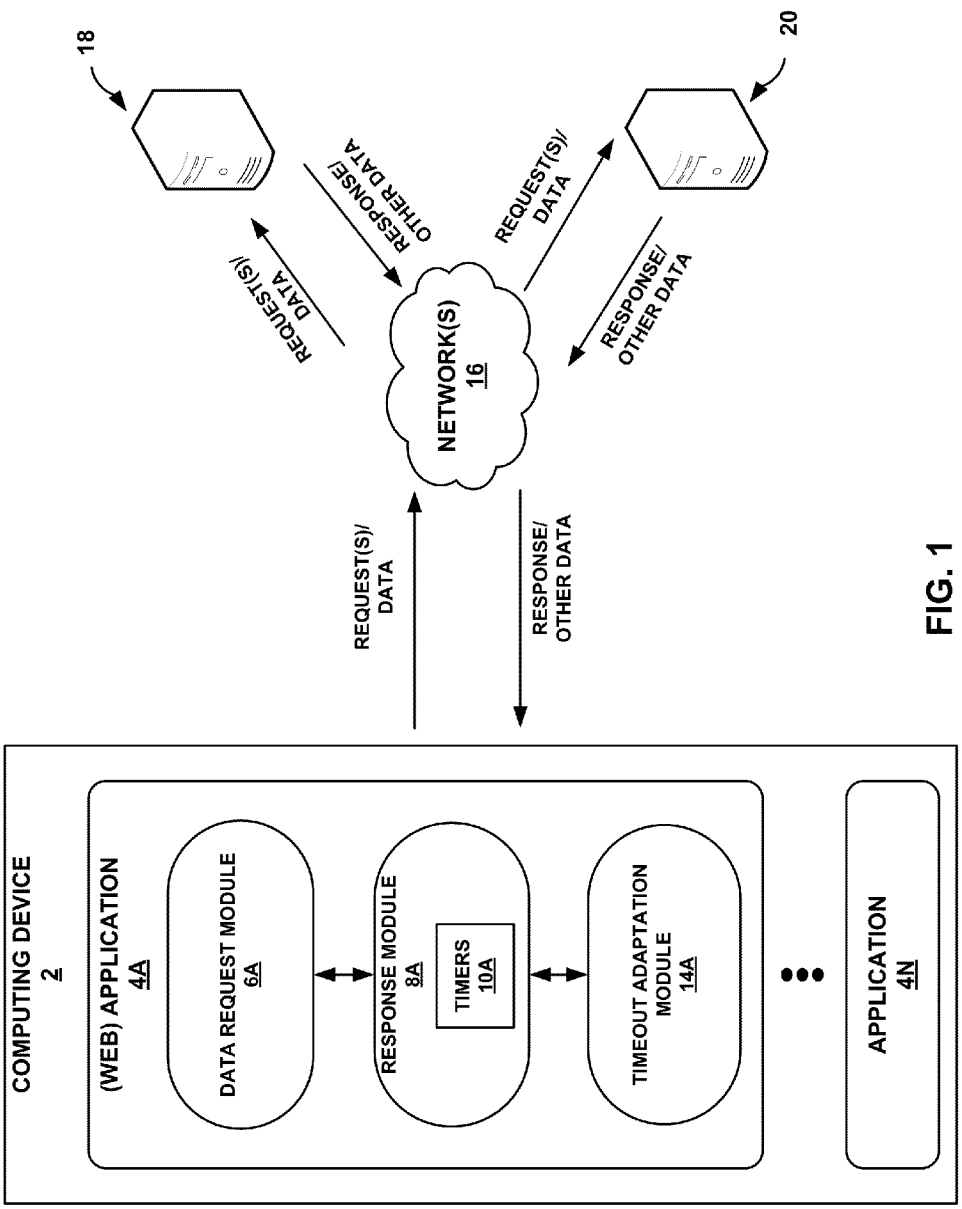
FIG. 1 is a block diagram illustrating an example computing device that may send data requests to one or more external servers and determine whether any data responsive to such requests is received, according to one or more aspects of the present disclosure.

FIG. 1 is a block diagram illustrating an example computing device 2 that may send data requests to one or more external servers 18, 20 and determine whether any data responsive to such requests is received, according to one or more aspects of the present disclosure. In the example of FIG. 1, two distinct servers 18 and 20 are communicatively coupled to computing device 2 via one or more networks 16. In other examples, however, any number of distinct servers may be communicatively coupled to computing device 2 via networks 16.

Computing device 2 may comprise one or more stand-alone devices or may be part of a larger system. In certain examples, computing device 2 may comprise a mobile device. For instance, computing device 2 may comprise or be part of a wireless communication device (e.g., wireless mobile handset or device), a video telephone, a digital multimedia player, a personal digital assistant (PDA), a video game console, a laptop computer, or other device. Computing device 2 may communicate with external, distinct servers 18, 20 via networks 16. Networks 16 may comprise one or more wired or wireless networks. For instance, networks 16 may comprise one or more local-area or wide-area networks, including wireless cellular networks. Networks 16 may provide access to the Internet. Servers 18 and 20 may comprise application or data servers, including one or more web servers storing data that may be provided to computing device 2 upon request.

As shown in FIG. 1, computing device 2 is capable of executing one or more executable applications 4A-4N. Each of these applications 4A-4N is operable on computing device 2 to perform one or more functions and communicate with server 18 and/or server 20 during execution. For example, one or more of applications 4A-4N may comprise a web application that requests data from server 18 and/or server 20. A web application may, in some instances, be executable within a web browser that is operable on computing device 2. Computing device 2 may, in various instances, download or otherwise obtain one or more of applications 4A-4N from server 18 and/or server 20 via networks 16. For instance, a web browser hosted by computing device 2 may download one or more of applications 4A-4N upon access of one or more web sites hosted by server 18 and/or server 20. Thus, server 18 and/or server 20 may host one or more of applications 4A-4N prior to these applications being downloaded to, or retrieved by, computing device 2.

FIG. 1 shows examples of certain executable modules 6A, 8A, 14A that may be included within a given application, such as application 4A. Although FIG. 1 shows these modules 6A, 8A, 14A as being included within application 4A, such modules may also be included within any of the other applications 4B-4N that are executable by computing device 2.

Application 4A includes a data request module 6A, a response module 8A, and a timeout adaptation module 14A. Data request module 6A may send one or more requests for data, during execution of application 4A, to server 18 and/or server 20 via networks 16. In some situations, data request module 6A may also send additional information to server 18 and/or server 20, either as part of or separate from the requests for data. Response module 8A may determine whether any data responsive to the requests has been received by application 4A, and may process such response data upon receipt. The response data may be provided back to computing device 2, via networks 16, from server 18 and/or server 20. Server 18 and/or server 20 may provide other data back to computing device 2, as well, either as part of or separate from the response data, which may include data for execution of one of applications 4A-4N on computing device 2.

Response module 8A includes timers 10A. Response module 8A may implement timers 10A to determine if data responsive to one or more requests has been received by computing device 2. For example, after data request module 6A has sent a request for data to an external device (e.g., to server 18), response module 8A may start a first request timer using a first request timeout value. The first request timeout value may specify a maximum amount of time to wait for receiving any data sent from server 18, in this example, which is responsive to the request.

If first data responsive to the request is received prior to expiration of the first request timer, response module 8A may cancel the first request timer and start a second request timer using a second request timeout value. The second request timeout value may specify a maximum amount of time to wait for receiving any additional data sent from server 18 that is further responsive to the request. If second data responsive to the request is received prior to expiration of the second request timer, response module 8A may cancel the second request timer. Timers 10A utilized by response module 8A may include the first request timer and the second request timer. In some examples, if no data responsive to the request is received prior to expiration of either of the first request timer or the second request timer, the request may be aborted, and data request module 6A may attempt to re-send the request.

As shown in FIG. 1, application 4A further includes a timeout adaptation module 14A, which is executable within application 4A by computing device 2. Timeout adaptation module 14A is capable, among other things, of dynamically adapting, or modifying, the timeout values that are used by timers 10A of response module 8A. For instance, continuing with the example above, timeout adaptation module 14A may update the first request timeout value based upon an amount of time between the sending of the request by data request module 6A and the receiving of the first data by response module 8A that is responsive to the request. The updating of the first request timeout value generates a first updated request timeout value. Timeout adaptation module 14A may further update the second request timeout value based upon an amount of time between the receiving of the first data by response module 8A that is responsive to the request and the receiving of the second, additional data that is responsive to the request. Updating of the second request timeout value generates a second updated request timeout value.

In this particular example, timeout adaptation module 14A may dynamically update the first and second request timeout value that are used by the respective first and second timers of timers 10A in response module 8A. Timeout adaptation module 14A may perform such dynamic updates based upon an amount of time between when data request module 6A sends a data request and when response module 8A receives initial data that is responsive to this request, and an amount of time between when response module 8A received the initial data and when it receives subsequent, additional data that is responsive to the request. As will be described in further detail below, timeout adaptation module 14A may continuously monitor the amount of time between receiving successive data items that are responsive to the request, and may then update the value of the second request timeout value based upon the longest period of time between receiving such successive data items.

Again continuing with the example above, upon updating the first and second timeout values of the first and second timers within timers 10A, responsive module 8A may then utilized the updated first and second timeout values when processing subsequent requests that are sent by data request module 6A. For instance, data request module 6A may send a new request for data to server 18 and/or server 20 via networks 16. Response module 8A may then start the first request timer within timers 10A using the first updated request timeout value, where the first updated request timeout value specifying a first amount of time to wait for receiving data that is responsive to the new request. When first data responsive to the new request is received prior to expiration of the first request timer, response module 8A may cancel the first request timer and start the second request timer using the second updated request timeout value, where the second updated request timeout value specifying a second amount of time to wait for receiving additional data that is further responsive to the new request. When second data responsive to the new request is received prior to expiration of the second request timer, response module 8A may cancel the second request timer. Response module 8A may determine whether the request is unsuccessful based upon expiration of the first request timer or the second request timer.

Although FIG. 1 shows only two external servers 18 and 20, any number of servers may be communicatively coupled to computing device 2 via networks 16. Also, although described with reference to first and second timers in the above example, timers 10A utilized by response module 8A may include any number of two or more timers that are used to track the receipt of successive data items received by response module 8A that are responsive to any given request that has been issued by data request module 6A.

Computing device 2 may, in various cases, be capable of detecting unsuccessful or failed data requests in a timely fashion, regardless of the size of actual or expected data that is at least partially responsive to these requests. In addition, when adaptively modifying implemented timeout values based upon actual response times to prior data requests, computing device 2 may, in various cases, account for variability in the amount of time for successful requests to complete due to various factors such as network quality and/or payload size.

A fixed or static timeout value setting may result in certain in drawbacks, because it may not account for certain environmental factors or communication conditions that could affect response times. For example, in a client/server environment, a server's response time may change considerably based on variable server workload and/or network congestion. The fixed or static timeout value may need to be large enough to account for the worst case network and/or payload size, and may therefore be less than ideal for fast networks or small payloads, in some cases. However, in some aspects of the present disclosure, by dynamically modifying and adapting the timeout values, computing device 2 may be able to mitigate such issues and account for variability in response times across one or more networks, because computing device 2 may not need to utilize such fixed or static timeout values.

Figure 2:
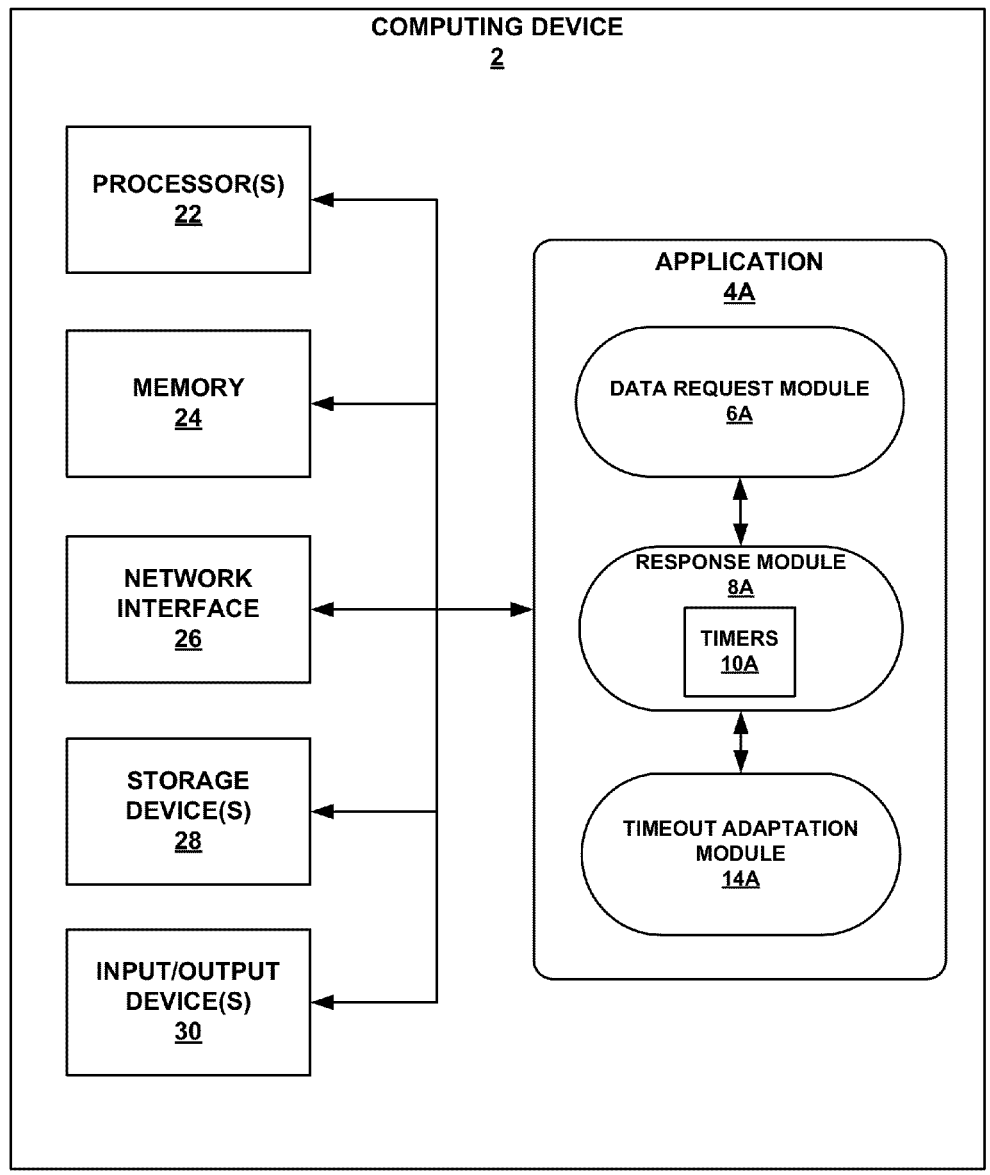
FIG. 2 is a block diagram illustrating further details of one example of the computing device shown in FIG. 1.

FIG. 2 is a block diagram illustrating further details of one example of the computing device 2 shown in FIG. 1. FIG. 2 illustrates only one particular example of computing device 2, and many other example embodiments of computing device 2 may be used in other instances.

As shown in the specific example of FIG. 2, computing device 2 includes one or more processors 22, memory 24, a network interface 26, one or more storage devices 28, and one or more input/output devices 30. Each of components 22, 24, 26, 28, and 30 may be interconnected via one or more busses for inter-component communications. Processors 22 may be configured to implement functionality and/or process instructions for execution within computing device 2. Processors 22 may be capable of processing instructions stored in memory 24 or instructions stored on storage devices 28.

Input/output devices 30 may include, for example, a monitor or other display device for presentation of visual information to a user of computing device 2. Input/output devices 30 may further include one or more input devices to enable a user to input data, such as a keyboard, mouse, touchpad, trackpad, etc. In some cases, input/output devices 30 may include a touchscreen, which may be used both to receive and process user input and also to display output information. Input/output devices 30 may further include printers or other devices to output information.

Memory 24 may be configured to store information within computing device 2 during operation. Memory 24 may, in some examples, be described as a computer-readable storage medium. In some examples, memory 24 is a temporary memory, meaning that a primary purpose of memory 520 is not long-term storage. Memory 24 may also be described as a volatile memory, meaning that memory 24 does not maintain stored contents when the computer is turned off. Examples of volatile memories include random access memories (RAM), dynamic random access memories (DRAM), static random access memories (SRAM), and other forms of volatile memories known in the art. In some examples, memory 24 may be used to store program instructions for execution by processors 22. Memory 24 may be used by software or applications running on computing device 2 (e.g., application 4A) to temporarily store information during program execution.

Storage devices 28 may also include one or more computer-readable storage media. Storage devices 28 may be configured to store larger amounts of information than memory 24. Storage devices 28 may further be configured for long-term storage of information. In some examples, storage devices 28 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 2 also includes network interface 26. Computing device 2 may utilize network interface 26 to communicate with external devices (e.g., server 18, server 20) via one or more networks (e.g., networks 16).

Any applications implemented within or executed by computing device 2 (e.g., applications 4A-4N shown in FIG. 1) may be implemented or contained within, operable by, executed by, and/or be operatively coupled to processors 22, memory 24, network interface 26, storage devices 28, and/or input/output devices 30.

For purposes of illustration only, application 4A is shown in the example of FIG. 2. Application 4A may include data request module 6A, response module 8A, and timeout adaptation module 14A. Application 4A may be stored in memory 24 and/or storage devices 30, and may be operable by processors 22 to perform various tasks during execution.

During implementation or execution of application 4A, processors 22 may be configured to send, to an external device (e.g., server 18 or server 20), a request for data, and to start a first request timer using a first request timeout value, as described in the prior example with respect to FIG. 1. The first request timeout value specifies a maximum amount of time to wait for receiving data sent from the external device that is responsive to the request. If first data responsive to the request is received prior to expiration of the first request timer, processors 22 may be configured to cancel the first request timer and start a second request timer using a second request timeout value, the second request timeout value specifying a maximum amount of time to wait for receiving additional data sent from the external device that is further responsive to the request. If second data responsive to the request is received prior to expiration of the second request timer, processors 22 may be configured to cancel the second request timer.

Figure 3:
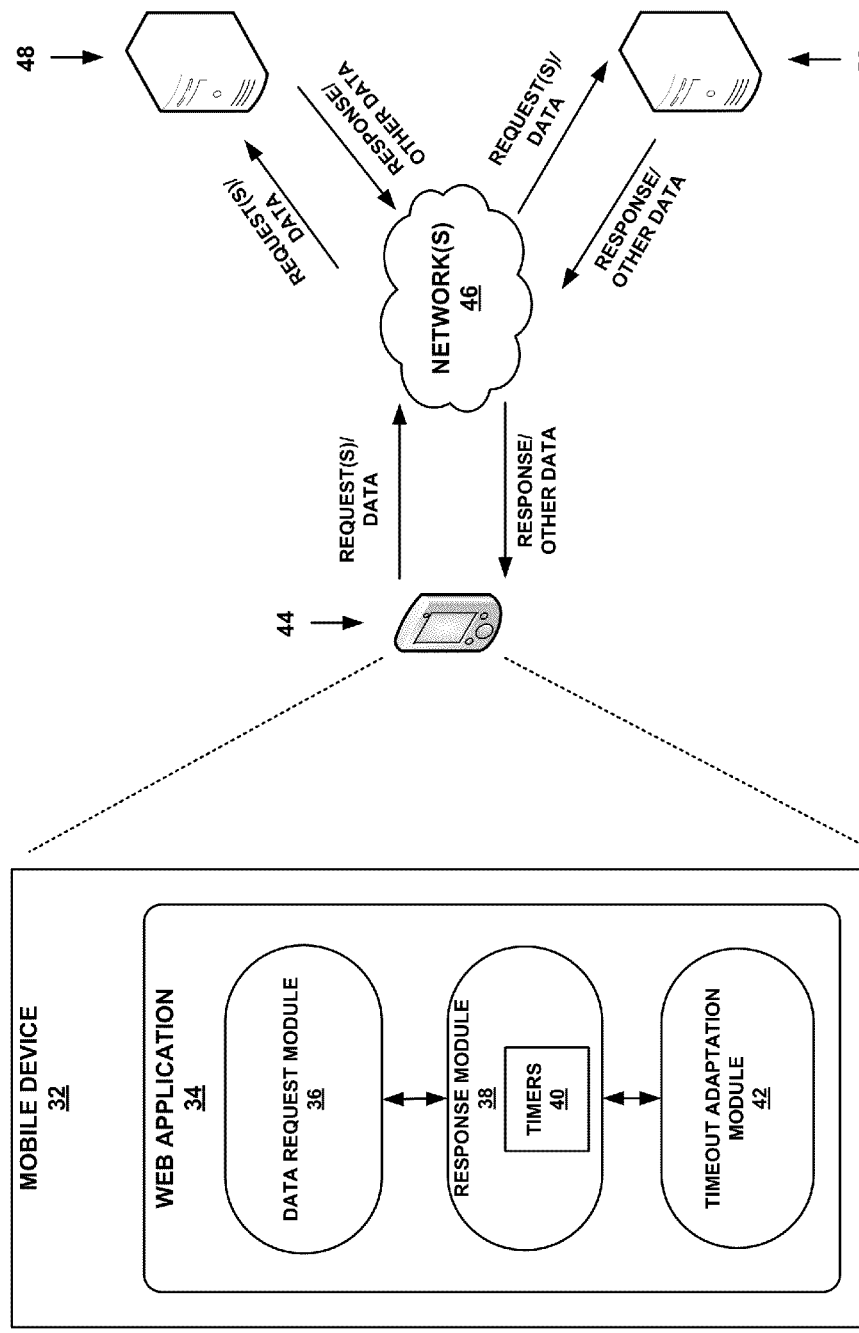
FIG. 3 is a block diagram illustrating an example mobile device that may send data requests to one or more external servers and determine whether any data responsive to such requests is received, according to one or more aspects of the present disclosure.

FIG. 3 is a block diagram illustrating an example mobile device 32 that may send data requests to one or more external servers, such as server 48 and/or server 50, and determine whether any data responsive to such requests is received, according to one or more aspects of the present disclosure. The details of FIG. 3 are similar to those of FIG. 1. In the example of FIG. 3, however, the illustrated device is specifically shown as mobile device 32. In FIG. 3, mobile device 32 may comprise one example of computing device 2 shown in FIG. 1.

Mobile device 32 may comprise or be part of a wireless communication device (e.g., wireless mobile handset or device), a video telephone, a digital multimedia player, a personal digital assistant (PDA), a video game console, a laptop computer, or other mobile device.

Servers 48 and 50 may comprise application or data servers, including one or more web servers storing data that may be provided to mobile device 32 upon request. Servers 48 and 50 are communicatively coupled to mobile device 32 via one or more networks 46. Networks 46 may comprise one or more wireless networks, including local-area and wide-area access networks. For example, networks 46 may comprise a cellular communication network. Networks 46 may provide mobile device 32 access to the Internet in some examples. Although two servers 48 and 50 are shown in FIG. 3, any number of different servers may be communicatively coupled to mobile device 32 via networks 46.

As shown in the example of FIG. 3, mobile device 32 may implement or execute a web application 34. Web application 34 may be one example of the applications 4A-4N shown in FIG. 1. Web application 34 may be downloaded or otherwise retrieved from server 48 or 50 via networks 46, and may then be implemented or executed by mobile device 32. In some examples, web application 34 may be executed within a web browser that is displayed to a user of mobile device 32. In some instances, web application 34 may present information to a user via a web browser. Non-limiting examples of web application 34 may include an email application, a calendar application, a game application, an online chat application, a news application, a blog application, or other form of web application.

Similar to application 4A shown in FIG. 1, web application 34 includes a data request module 36, a response module 38, and a timeout adaptation module 42. Response module 38 utilizes timers 40. In the example of FIG. 3, data request module 36 may function similarly to data request module 6A of FIG. 1. Likewise, response module 38 may function similarly to response module 8A, and timeout adaptation module 42 may function similarly to timeout adaptation module 14A.

FIG. 4 is a block diagram illustrating one example of mobile device 32 shown in FIG. 3, which is capable of sending one or more Extensible Markup Language Hypertext Transfer Protocol Requests (XMLHttpRequests) and determining whether any data responsive to these XMLHttpRequests is received, according to one or more aspects of the present disclosure. In the particular example of FIG. 4, mobile device 32 may execute a web browser 60 that is usable by a user to access Internet web content provided by one or more servers, such as servers 48 and/or 50 shown in FIG. 3. Examples of browser 60 may include Internet Explorer® browser, Mozilla® browser, and Chrome™ browser, to name only a few. In the example of FIG. 4, web application 34 is executable within browser 60. For instance, in some cases, upon user interaction with browser 60, mobile device 32 may download or otherwise retrieve executable code (e.g., JavaScript code, other ECMAScript code) for web application 34 via server 48 and/or server 50, and may then execute web application 34 within browser 60.

Web application 34 may comprise any form of executable software instructions. In the example of FIG. 4, web application 34 may comprise executable JavaScript software code for a JavaScript program, or any other code (e.g., other ECMAScript code). JavaScript code is often referred to as one dialect of ECMAScript code. The code may, when executed, instantiate and use one or more Extensible Markup Language Hypertext Transfer Protocol Request (XMLHttpRequest, "XHR") objects 60A-60N to send data requests to an external server (e.g., server 48 or server 50 shown in FIG. 3) via a network. XHR objects may be utilized within a program to send an HTTP (Hypertext Transfer Protocol) or HTTPS (Hypertext Transfer Protocol Secure) request to a server and retrieve the server response data for use by the program. The response data may be available as one or more XML documents and/or as plain text.

The code (e.g., JavaScript code) may also utilize XHR objects 60A-60N when processing response data for the requests. As shown in FIG. 4, data request module 36, response module, and/or timeout adaptation module 42 of web application 34 may utilize or interact with XHR objects 60A-60N during execution of modules 36, 38, and/or 42. In some examples, each XHR object 60A-60N may be associated with a particular network, network type, and/or server. For instance, web application 34 may instantiate XHR object 60A for transmitting requests to server 48 (FIG. 3) via one of networks 46, and may instantiate XHR object 60N for transmitting requests to server 50 via one of networks 46. Over the course of time, web application 34 may, in this particular example, continue to use XHR object 60A for requests that are sent to server 48, and to use XHR object 60N for requests that are sent to server 50. Of course, if web application 34 sends multiple concurrent or overlapping requests to the same server (e.g., server 48), web application 34 may instantiate and/or use multiple ones of XHR objects 60A-60N associated with these requests.

As shown in FIG. 4, each XHR object 60A-60N may include one or more methods and one or more event listeners, as well as one or more attributes. For instance, XHR object 60A includes one or more methods/event listeners 62A and attributes 64A. Similarly, XHR object 60N includes one or more methods/event listeners 62N and attributes 64N. For purposes of illustration only, methods/event listeners 62A and attributes 64A will be described in further detail below, although similar methods/event listeners and attributes may be included within any of XHR objects 60A-60N.

Methods/event listeners 62A may include an "open" method, a "setRequestHeader" method, and a "send" method, as will be now further described. The "open" method of XHR object 60A may be invoked by web application 34 (e.g., by data request module 36) prior to the actual sending of a data request. This method can accept one or more input parameters to initialize a request. A first input parameter may comprise a text string indicating the HTTP/HTTPS request method to use. A second input parameter may comprise a text string indicating the Uniform Resource Identifier (URI) of the request. A third input parameter may comprise a value indicating whether the request will be synchronous or asynchronous. An asynchronous request will not wait on a server response before continuing on with the execution of the current script, but will instead invoke an "onreadystatechange" event listener of XHR object 60A throughout the various stages of the request, as will be described in more detail below. A synchronous request, however, will hang execution of the current script until the request has been completed, and may not invoke the "onreadystatechange" event listener.

Methods/event listeners 62 may further include a "setRequestHeader" method. Upon successful initialization of a request, the "setRequestHeader" method of XHR object 60A can be invoked by web application 34 to send HTTP/HTTPS headers with the request. The first parameter of this method may comprise the text string name of the header. The second parameter may comprise the text string value. This method may be invoked for each header that needs to be sent with the request.

Methods/event listeners 62A may further include a "send" method, which may be invoked by web application 34 (e.g., data request module 36) to send an HTTP/HTTPS request. This method may accept an input parameter containing the content to be sent with the request, but may be omitted if no content needs to be sent. In some cases, methods/event listeners 62A may also include an "abort" method, which may be invoked by web application 34 to abort a request associated with XHR object 60A.

Methods/event listeners 62A may further include an "onreadystatechange" event listener, which may interact with response module 38. If the "open" method of XHR object 60A was previously invoked by web application 34 with a parameter set to indicate that the HTTP request is asynchronous request, the "onreadystatechange" event listener may be automatically invoked for each action that changes the value of a "readyState" attribute of XHR object 60A and/or that changes the "responseText" attribute (e.g., changes the content or length of the "responseText" attribute). The "responseText" attribute may contain the response data for a request in plain text, and The "readyState" attribute and the "responseText" attribute may each be part of attributes 64A.

After the "open" method has been invoked successfully, the "readyState" attribute of XHR object 60A may be assigned a value of 1. After the "send" method has been invoked and the HTTP response headers have been received, the "readyState" attribute may be assigned a value of 2. Once the HTTP response content begins to load and be processed by response module 38, the "readyState" attribute of may be assigned a value of 3. Once the HTTP response content has finished loading, the "readyState" attribute of the XMLHttpRequest object should be assigned a value of 4. As noted above, the "onreadystatechange" event listener of XHR object 60A may be invoked each time the value of the "readyState" attribute changes.

Response module 38 may process the response data that is received by web application upon issuance of the HTTP request triggered by XHR object 60A. After a successful and completed call to the "send" method of XHR object 60A, if the response data contains valid XML content, a "responseXML" attribute of XHR object 60A may contain a document object that may be used by web application 34. Another attribute, "responseText," may contain the response data in plain text. Both the "responseXML" attribute and the "responseText" attribute may be included within attributes 64A.

In some examples, as will be described in further detail below, additional attributes may be provided on a per-XHR object basis, which may be stored in respective attributes 64A-64N or may be stored by web application 34. For instance, a "TIME_TO_FIRST" attribute and a "TIME_TO_MORE" attribute may be provided for each of XHR objects 60A-60N. The "TIME_TO_FIRST" attribute may represent a maximum amount of time that may pass without receiving any initial data that is responsive to a request for XHR object 60A before considering that request to have timed out. The value of "TIME_TO_FIRST" may be based upon a maximum amount of time between when web application 34 sends the request and when web application 34 should have received initial data responsive to the request.

The "TIME_TO_MORE" attribute may represent a maximum amount of time that may pass without receiving additional data responsive to the request before considering the same request to have timed out. The value of "TIME_TO_MORE" may based upon a maximum amount of time between when web application 34 receives data responsive to the request and when web application 34 should have received additional data responsive to the request. Initial and current values of "TIME_TO_FIRST" and "TIME_TO_MORE" may be included within attributes 64A or managed by web application 34. Initial values of "TIME_TO_FIRST" and "TIME_TO_MORE" may be referred to as "INIT_TIME_TO_FIRST" and "INIT_TIME_TO_MORE," respectively. Current values of "TIME_TO_FIRST" and "TIME_TO_MORE" may be referred to as "CUR_TIME_TO_FIRST" and "CUR_TIME_TO_MORE," respectively.

In some cases, web application 34 may include or be configured to select initial values of "INIT_TIME_TO_FIRST" and "INIT_TIME_TO_MORE." In some cases, web application 34 may include values for "INIT_TIME_TO_FIRST" and "INIT_TIME_TO_MORE" that are provided by the external device/server upon retrieval of web application 34 by mobile device 32 from the external device/server.

To provide one specific, yet non-limiting, example, reference is made to the following pseudo-code:

INITIAL STATE:
1. Let TIME_TO_FIRST=INIT_TIME_TO_FIRST
2. Let TIME_TO_MORE=INIT_TIME_TO_MORE
WHEN A REQUEST NEEDS TO BE SENT:
1. Start a first timer that will fire after TIME_TO_FIRST.
2. Send a request associated with an XHR object.
3. If the first timer expires, then abort the request and consider the request to have timed out. Abort the request, perform optional INITIAL STATE flow and then retry the request.
4. If any data is received (e.g., detected using the onreadystatechange event listener) then cancel the first timer.
5. Start a second timer that will fire after TIME_TO_MORE.
6. If the second timer expires, then abort the request and consider the request to have timed out. Abort the request, perform optional INITIAL STATE flow and then retry the request.
7. If any additional data is received (e.g., detected using the onreadystatechange event listener) then cancel the second timer.
8. If the response is not complete, then continue from act 5.
9. Let CUR_TIME_TO_FIRST=the time between acts 4 and 1.

10. Let CUR_TIME_TO_MORE=the longest time between acts 7 and 5.
11. Let TIME_TO_FIRST=ADAPT_FUNC(TIME_TO_FIRST, CUR_TIME_TO_FIRST).
12. Let TIME_TO_MORE=ADAPT_FUNC(TIME_TO_MORE, CUR_TIME_TO_MORE).
ADAPT_FUNC is the function that adjusts the timeout values based on a new time-to-data value. For example:

ADAPT_FUNC(base_time,new_time)=(base_time*0.5)+(new_time*0.5)+4.0

During execution of web application 34, web application 34 may instantiate a first XHR object, such as XHR object 60A, in order to send a data request to an external server, such as server 48 or server 50 shown in FIG. 3. In this example, web application 34 may invoke the "open" method of XHR object 60A specifying the URI of the external server to which the request is to be sent, and further specifying that the request is asynchronous, such that the "onreadystatechange" event listener of XHR object 60A may be invoked if/when response data is received.

Response module 38 may start a first timer from timers 40 (act 1 of the pseudo-code). Response module 38 may set the timeout value of the first timer equal to "TIME_TO_FIRST." Web application 34 may invoke the "send" method of XHR object 60A to send the request (act 2 of the pseudo-code). If the first timer expires (e.g., times out) prior to response module 38 receiving any response data, response module and/or data request module 36 aborts the request for XHR object 60A, and data request module 36 may attempt to re-send the request (act 3 of the pseudo-code). In some examples, web application 34 may reset the values of "TIME_TO_FIRST" and "TIME_TO_MORE" to the initial values upon aborting the request, though in other examples, web application 34 may not re-set these values. In some examples, rather than attempting the re-send the request right away, web application 34 may add a delay (e.g., an exponential back-off delay based upon the number of failed attempts) before attempting to re-send the request.

If, however, response module 38 receives initial data responsive to the request prior to the expiration of the first timer, response module 38 may cancel the first timer (act 4 of the pseudo-code) and start a second timer from timers 40 (act 5 of the pseudo-code). Response module 38 may set the timeout value of the second timer equal to "TIME_TO_MORE." The "onreadystatechange" event listener for XHR object 60A may be automatically invoked when initial data that is responsive to the request has been received. Response module 38 may then analyze the value of the "readyState" attribute of XHR object 60A. For instance, the value of "readyState" may change from 2 to 3 once initial data responsive to the request has been received.

If response module 38 starts the second timer, response module 38 may await additional data responsive to the request. If the second timer expires prior to response module 38 receiving any additional data, response module 38 and/or data request module 36 may abort the request, and data request module 36 may attempt to re-send the request (act 6 of the pseudo-code). In some examples, web application 34 may reset the values of "TIME_TO_FIRST" and "TIME_TO_MORE" to the initial values upon aborting the request, though in other examples, web application 34 may not re-set these values. In some examples, rather than attempting the re-send the request right away, web application 34 may add a delay (e.g., an exponential back-off delay based upon the number of failed attempts) before attempting to re-send the request.

If, however, response module 38 does receive additional data prior to the expiration of the second timer, response module 38 may cancel the second timer (act 7 of the pseudo-code). In some cases, web application 34 may monitor the "responseText" attribute of XHR object 60A during response processing to determine if any additional data responsive to the request has been received. For example, the "onreadystatechange" event listener may be automatically invoked for each action that changes the value of the "readyState" attribute of and/or the value of the "responseText" attribute. Response data may typically be added (e.g., concatenated) to the value of the "responseText" attribute. For example, if the "responseText" attribute is a string variable, any incoming response data text could be concatenated to the "responseText" string variable during response processing. In this case, web application 34 may continually monitor the length of the string variable "responseText" (e.g., "responseText.length" in JavaScript) to determine if additional response data has been received. Each time additional data is received, the length of "responseText" may increase.

Web application may 34 may next determine whether the response to the request is complete (act 8 of the pseudo-code). In cases where there response is not yet complete, response module 38 may iteratively repeat the process of starting the second timer, using the timeout value of "TIME_TO_MORE," and checking whether further additional data is received prior to the expiration of the second timer (e.g., continue from act 5 of the pseudo-code).

Response module 38 may determine whether the response to the request is complete, or if there is any further data that is expected to be received, by monitoring the value of the "readyState" attribute within attributes 64A of XHR object 60A. For instance, if the value of the "readyState" attribute is 3, indicating that response content has begun loading, response module 38 may expect to receive further response data for the request of XHR object 60A, and may therefore continue to iteratively repeat the process of starting the second timer and checking for response data. Once, however, the value of the "readyState" attribute is 4 for XHR object 60A, response module 38 may recognize that the response data is complete. Thus, response module 38 may continue to process response data for a given request until the value of the "readyState" attribute is equal to 4.

When the response is complete, response module 38 may determine the value of the actual amount of time ("CUR_TIME_TO_FIRST") between its sending of the request and the receipt of initial data (e.g., the time between acts 4 and 1 of the pseudo-code). In some instances, the value of "CUR_TIME_TO_FIRST" may be included within attributes 64A or managed/stored by web application 34 (e.g., as a variable) associated with XHR object 60A.

Response module 38 may also determine the value of the actual amount of time ("CUR_TIME_TO_MORE") between its receipt of the initial data that was responsive to the request and its receipt of additional data responsive to the request (e.g., the time between acts 7 and 5). When multiple iterations between acts 5 and 7 are performed, response module 38 may determine the longest period of time between acts 7 and 5 for a given one of the multiple iterations (e.g., worst case). In some alternate examples, however, response module 38 may determine the shortest period of time between acts 7 and 5 for a given iteration, or may determine the average period of time between acts 7 and 5 for the multiple iterations. The value of "CUR_TIME_TO_MORE" may be included within attributes 64A and/or managed/stored by web application 34 (e.g., as a variable) associated with XHR object 60A.

Over time, web application 34 may process many different requests for one or more of XHR requests 60A-60N. In some examples, any time web application 34 determines updated values of "CUR_TIME_TO_FIRST" and "CUR_TIME_TO_MORE", web application 34 may invoke timeout adaptation module 42 that dynamically adapts the timeout values of "TIME_TO_FIRST" and "TIME_TO_MORE" based on the values of "CUR_TIME_ TO_FIRST" and "CUR_TIME_TO_ MORE." For example, as will be described in further detail below, timeout adaptation module 42 may update the value of "TIME_TO_FIRST" of XHR object 60A for use in subsequent request processing by XHR object 60A based upon the value of "CUR_TIME_TO_FIRST" associated with XHR object 60A.

Likewise, timeout adaptation module 42 may update the value of "TIME_TO_MORE" of XHR object 60A based upon the value of "CUR_TIME_TO_MORE" for use in subsequent request processing. Thus, for subsequent requests issued by data request module 36 using XHR object 60A, response module 38 may use timers 40 having dynamically updated timeout values for "TIME_TO_FIRST" and "TIME_ TO_MORE" based at least in part upon previously determined response times for prior requests associated with XHR object 60A and transmitted by data request module 36, which may account for variations in network speed and/or payload size. Furthermore, variations in the implementation of timeout adaptation module 42 may allow the values of "TIME_ TO_FIRST" and/or "TIME_TO_MORE" adapt faster or slower, as will be described in more detail below.

As shown in the pseudo-code, timeout adaptation module 42 may invoke dynamically update, or adapt, the value of "TIME_TO_FIRST" by invoking the "ADAPT_FUNC" function and passing in the two parameters of "TIME_TO_FIRST" and "CUR_TIME_TO_FIRST." Similarly, timeout adaptation module 42 may invoke dynamically update, or adapt, the value of "TIME_TO_MORE" by invoking the "ADAPT_FUNC" function and passing in the two parameters of "TIME_TO_MORE" and "CUR_TIME_TO_MORE."

In the pseudo-code, "ADAPT_FUNC" is a function that adjusts the timeout values based on new time-to-data values. The example function of the pseudo-code is shown for purposes of illustration only. In the example function, both the base time (e.g., "TIME_TO_FIRST," "TIME_TO_MORE") and the new time ("CUR_TIME_TO_FIRST," "CUR_TIME_ TO_MORE") are equally weighted, and an example delay factor ("4.0") is also added. Variations of the "ADAPT_FUNC" function may be provided to allow the values of "TIME_TO_FIRST" and/or "TIME_TO_MORE" to adapt, or change, at different rates.

As one example, the weighting factor applied to the base time could be greater than the weighting factor applied to the new time in order to cause adaptation to occur more slowly. For instance, "ADAPT_FUNC" may apply a weighting factor of "0.8" to "TIME_TO_FIRST" and a weighting factor of "0.2" to "CUR_TIME_TO_FIRST" to cause the value of "TIME_TO_FIRST" to adapt more slowly with respect to newly determined response time measurements.

Conversely, the weighting factor applied to the base time could be less than the weighting factor applied to the new time in order to cause adaptation to occur more quickly. For instance, "ADAPT_FUNC" may apply a weighting factor of "0.2" to "TIME_TO_MORE" and a weighting factor of "0.8" to "CUR_TIME_TO_MORE" to cause the value of "TIME_TO_MORE" to adapt more quickly with respect to newly determined response time measurements.

In other examples, timeout adaptation module 42 may implement another adaptation function that updates the values of "TIME_TO_FIRST" and "TIME_TO_MORE" simply by obtaining average values. For instance, timeout adaptation module 42 may store a defined number of previously captured values of "CUR_TIME_TO_FIRST" and update the value of "TIME_TO_FIRST" based upon an average of these defined number of previously captured values. Timeout adaptation module 42 may update "TIME_TO_MORE" in a similar fashion. In these examples, timeout adaptation module 42 may therefore update the values of "TIME_TO_FIRST" and "TIME_TO_MORE" based upon running averages of a defined number of previously captured values of "CUR_TIME_TO_FIRST" and "CUR_TIME_TO_MORE," respectively.

In some alternate cases, timeout adaptation module 42 may utilize different adaptation functions, which may implement similar or different weighting values, when updating the values of "TIME_TO_FIRST" and "TIME_TO_MORE." For instance, timeout adaptation module 42 may utilize a first adaptation function (e.g., "ADAPT_FUNC_1") for updating the value of "TIME_TO_FIRST," and may utilize a second adaptation function (e.g., "ADAPT_FUNC_2") for updating the value of "TIME_TO_MORE." By utilizing different adaptation functions, timeout adaptation module 42 may be capable of customizing function definitions and/or weighting factors for the two different timeout values of "TIME_TO_FIRST" and "TIME_TO_MORE."

In some examples, the values of certain attributes, such as "TIME_TO_FIRST" and "TIME_TO_MORE," may be replicated and/or duplicated in association with each of XHR objects 60A-60N. In these examples, any changes to one or more of these values by timeout adaptation module 42 may be replicated across all of XHR objects 60A-60N.

In other instances, however, each of the one or more XHR objects 60A-60N may maintain separate, individual values of "TIME_TO_FIRST" and "TIME_TO_MORE." In these instances, timeout adaptation module 42 may update the "TIME_TO_FIRST" and "TIME_TO_MORE" values separately and distinctly for each of XHR objects 60A-60N. These values may be maintained separately if each of XHR objects 60A-60N is associated with different types of requests that are to be monitored and updated separately. For example, web application 34 may instantiate and use XHR object 60A to initiate requests over a first, or first type, of network within networks 46 (FIG. 3) to server 48, but may instantiate and use another XHR object 60N to initiate requests over a second, or second type, of network within networks 46 to server 50. In some cases, web application 34 may instead maintain values of these attributes directly (e.g., as global and/or local variables), and may utilize these values when processing one or more of XHR objects 60A-60N.

In some cases, web application 34 may dynamically select the initial values of "INIT_TIME_TO_FIRST" and "INIT_TIME_TO_MORE" during application execution. In some cases, web application 34 may include hard-coded or pre-defined values of "INIT_TIME_TO_FIRST" and "INIT_TIME_TO_MORE." For example, in some cases, mobile device 32 may download or receive web application 34 from a server (e.g., server 48 or server 50 in FIG. 3), and the server may provide the values of "INIT_TIME_TO_FIRST" and "INIT_TIME_TO_MORE" within web application 34 for use by mobile device 32 during execution of web application 34.

In some cases, to determine the values "INIT_TIME_TO_FIRST" and "INIT_TIME_TO_MORE," aggregate data can be collected by the server from clients that have downloaded and executed web application (e.g., mobile device 32 and/or other mobile devices that have downloaded web application

34) to measure the time between acts 4 and 1 of the pseudo-code (i.e., "CUR_TIME_TO_FIRST"), as well as between acts 7 and 5 in the pseudo-code (i.e., "CUR_TIME_TO_MORE"). By collecting this data from real mobile devices, the server can aggregate the received response time data and compute values of "INIT_TIME_TO_FIRST" and "INIT_TIME_TO_MORE" that take into account the characteristics of the networks utilized by these mobile devices. Once this data is collected, the values of "INIT_TIME_TO_FIRST" and "INIT_TIME_TO_MORE" may be chosen such that they are long enough to allow most successful requests to complete without being marked as timed out, at least based upon the response time data that has been collected.

In some examples, the value of "TIME_TO_FIRST" could be determined to incorporate an amount of time, or an estimated/anticipated amount of time, that it may take the server to form a response and start sending it. As one example, a request of a type that requests a static resource may not require much processing by the server, and so the server may not need much time before it can start sending the response. If, however, the request is of a type that initiates a search or that causes the server to perform a write action, then it might take the server some time to process the request, form a response, and start sending the response. In this case, the value of "TIME_TO_FIRST" could be adjusted or changed to add a time value (e.g., a constant or defined time value) based upon the type of request that is being made (e.g., a request that may take longer for the external device to process).

When mobile devices (e.g., mobile device 32) are configured to provide time measurement data to the server for aggregation, users of these devices may explicitly opt-in or opt-out of the data collection service. For instance, if a user of a given mobile device does not wish for any data be sent to the server for purposes of data collection or aggregation, the user may disable or opt-out of this data collection feature, such that no such time measurement data is sent to the server.

Figure 5A:
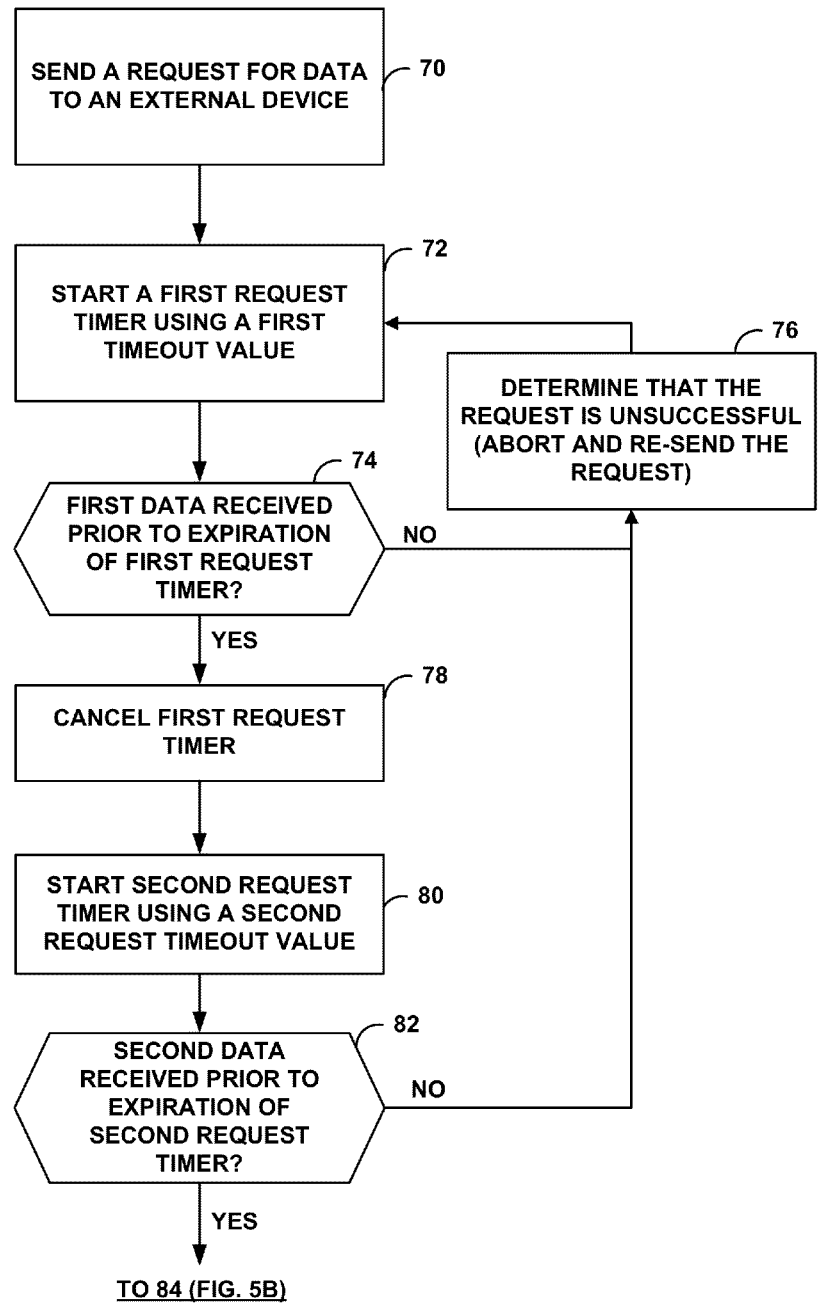
FIGS. 5A-5B are first and second portions of a flow diagram illustrating an example method that may be performed by a computing device to send a data request and determine whether any data responsive to the request is received, according to one or more aspects of the present disclosure.
Figure 5B:
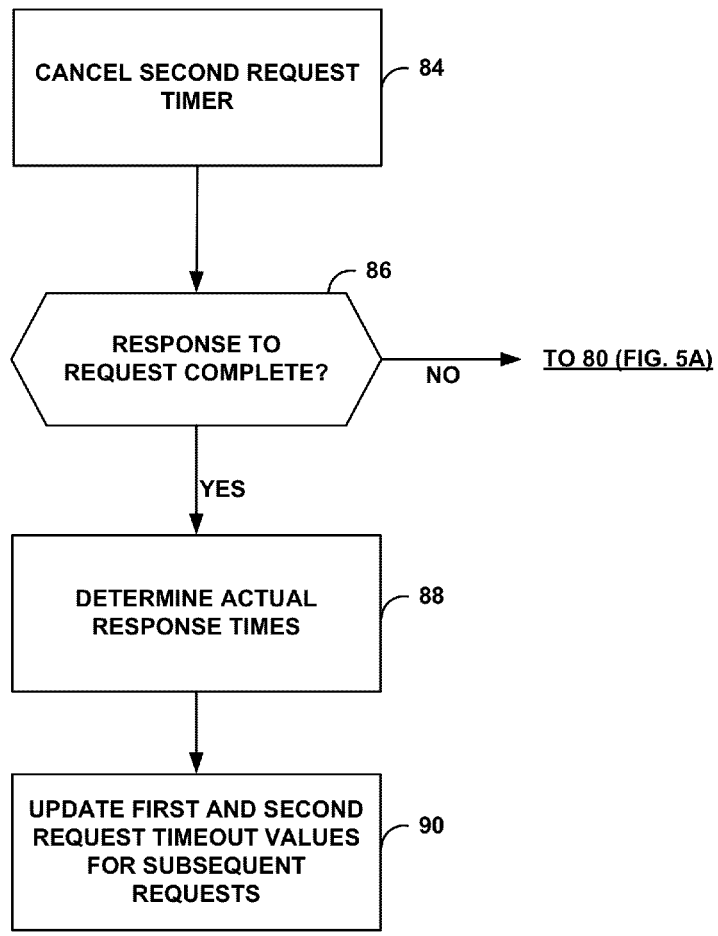

FIGS. 5A-5B are first and second portions of a flow diagram illustrating an example method that may be performed by a computing device to send a data request and determine whether any data responsive to the request is received, according to one or more aspects of the present disclosure. For instance, the illustrated example method may be performed by computing device 2 (FIG. 1) and/or mobile device 32 (FIGS. 3 and 4). For purposes of illustration only, reference will be made to computing device 2 in the description below. In some examples, a computer-readable storage medium (e.g., a computer-readable storage medium included in storage devices 28 of FIG. 2) may be encoded with instructions that, when executed, cause one or more processors (e.g., processors 22) to perform one or more of the acts illustrated in the method of FIGS. 5A-5B.

Initially, the method illustrated in FIGS. 5A-5B includes sending, to an external device (e.g., web server), a request for data initiated by a web application (70). For example, data request module 6A may send an HTTP or HTTPS request associated with an XML object (e.g., XHR object) to server 18 or 20 (FIG. 1). The web application may initiate the request via the XML object. The method further includes starting a first request timer (e.g., by response module 8A) using a first request timeout value, the first request timeout value specifying a first (e.g., maximum) amount of time to wait for receiving data sent from the external device that is responsive to the request (72). A check is made to determine whether data responsive to the request is received prior to expiration of the first request timer (74).

If first data responsive to the request is not received prior to expiration of the first request timer ("NO" branch of 74), the method includes aborting the request (e.g., by response module 8A) and attempting to re-send the request (e.g., by data request module 6A) (76). The method includes determining that the request is unsuccessful based upon expiration of the first request timer. The first request timer may be re-started using the first timeout value (72).

If first data responsive to the request is, however, received prior to expiration of the first request timer ("YES" branch of 74), the method includes cancelling the first request timer (e.g., by response module 8A) and starting a second request timer using a second request timeout value (80), the second request timeout value specifying a second (e.g., maximum) amount of time to wait for receiving additional data sent from the external device that is further responsive to the request. A check is made to determine if additional data responsive to the request is received prior to expiration of the second request timer (82).

If second data responsive to the request is not received prior to expiration of the second request timer ("NO" branch of 82), the method includes aborting the request and attempting to re-send the request (76). The method includes determining that the request is unsuccessful based upon expiration of the second request timer. Upon expiration of the second request timer, the first request timer may be re-started using the first timeout value (72).

If, however, second data responsive to the request is received prior to expiration of the second request timer ("YES" branch of 82), the method includes cancelling the second request timer (84 of FIG. 5B). A check is then made to determine whether the response to the request is complete, or whether there is further additional data to process (86). In some examples, a computing device performing the method of FIGS. 5A-5B may utilize information contained in packet headers of received data to determine whether the response is complete. In those examples in which the computing device executes a JavaScript program (or other ECMAScript program), the computing device may determine whether the response is complete by analyzing the value of the "readyState" attribute of the XHR object associated with the pending request. The response may be complete when the value of this "readyState" attribute is equal to 4.

If the response is not yet complete, and there is further additional data to process responsive to the request ("NO" branch of 86), the method may include iteratively repeating various selected acts of the method. For instance, the method may further include re-starting the second request timer using the second request timeout value (80 of FIG. 5A) and awaits further additional response data. If, however, the response is complete ("YES" branch of 86), the method further includes determining actual response times for data that has been received responsive to the initiated request (88). For instance, the computing device may determine an amount of time between the sending of the request and the receiving of the first data that is responsive to the request. The computing device may further determine an amount of time between the receiving of the first data that is responsive to the request and the receiving of the second data that is responsive to the request.

The method further includes updating the first and second request timeout values, which may be used when processing subsequent requests (90). For instance, timeout adaptation module 14A may update the first request timeout value based upon the amount of time between the sending of the request and the receiving of the first data that is responsive to the request, wherein the updating of the first request timeout value generates a first updated request timeout value. Timeout adaptation module 14A may also update the second request timeout value based upon an amount of time between the receiving of the first data that is responsive to the request and the receiving of the second data that is responsive to the request, wherein the updating of the second request timeout value generates a second updated request timeout value.

Upon updating the first and second request timers, the method of FIGS. 5A-5B may further include, in some examples, sending a new request for data (e.g., restarting the method at 70 for such a new request). The method may include starting the first request timer using the first updated request timeout value, the first updated request timeout value specifying a first (e.g., maximum) amount of time to wait for receiving data that is responsive to the new request. If first data responsive to the new request is received prior to expiration of the first request timer, the method may include cancelling the first request timer and starting the second request timer using the second updated request timeout value, the second updated request timeout value specifying a second (e.g., maximum) amount of time to wait for receiving additional data that is further responsive to the new request. If, however, second data responsive to the new request is received prior to expiration of the second request timer, the method may include cancelling the second request timer.

The method may further include updating the first updated request timeout value based upon an amount of time between the sending of the new request and the receiving of the first data that is responsive to the new request, and updating the second updated request timeout value based upon an amount of time between the receiving of the first data that is responsive to the new request and the receiving of the second data that is responsive to the new request.

In many instances, the method shown in FIGS. 5A-5B may include iteratively re-starting the second request timer using the second request timeout value and determining whether further additional data responsive to a given request is received prior to expiration of the second request timer. Once all data responsive to the request has been received (e.g., "YES" branch of 86), the method may include determining actual response times and updating the first and second request timeout values. For instance, the method may include updating the first request timeout value based upon an amount of time between the sending of the request and the receiving of the first data that is responsive to the request. With respect to the second request timeout value, the method may include updating this value based upon a longest amount of time (e.g., worst case for any of the iterations) between the receiving of additional data that is responsive to the request and the receiving of further additional data that is responsive to the request. In some alternate examples, the second request timeout value may be updated using other techniques (e.g., the shortest or average amount of time for any of the iterations between the receiving of additional data that is responsive to the request and the receiving of further additional data that is responsive to the request).

In some examples, the method of FIGS. 5A-5B may further include receiving an initial value of the first request timeout value from the external device prior to starting the first request timer, and receiving an initial value of the second request timeout value from the external device prior to starting the second request timer. For instance, a computing device (e.g., computing device 2) may receive such initial values (e.g., "INIT_TIME_TO_FIRST," "INIT_TIME_TO_MORE" as described in prior examples) from server 18 or server 20. These values may be provided to the computing device upon retrieval of an application (e.g., application 4A) from the external device. In some cases, the external device may determine these initial values based upon aggregate data that is collected from one or more computing devices (e.g., computing device 2), as described previously.

In some examples, the method of FIGS. 5A-5B may further include determining a type of the request that is indicative of a type of action that is to be performed by the external device in responding to the request, and adjusting the first request timeout value based upon the type of the request prior to starting the first request timer. For instance, the first timeout value could be determined to also incorporate the amount of time, or an estimated/anticipated amount of time, that it may take the external device to form a response and start sending it. As one example, a request of a type that requests a static resource may not require much processing by the external device, and so the external device may not need much time before it can start sending the response. If, however, the request is of a type that initiates a search or that causes the external device to perform a write action, then it might take the external device some time to process the request, form a response, and start sending the response. In this case, the first request timeout value could be adjusted or changed to add a time value (e.g., a constant or defined time value) based upon the type of request that is being made (e.g., a request that may take longer for the external device to process).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various embodiments of the invention have been described. These and other embodiments are within the scope of the following claims.

The invention claimed is:

1. A non-transitory computer-readable storage medium encoded with instructions that, when executed, cause one or more processors to:
   upon sending a request for data to an external device, start a first request timer using a first request timeout value, the first request timeout value specifying a maximum amount of time to wait for receiving data sent from the external device that is responsive to the request;
   when the data responsive to the request is received prior to expiration of the first request timer, start a second request timer using a second request timeout value, the second request timeout value specifying a maximum amount of time to wait for receiving additional data sent from the external device that is further responsive to the request;
   when the additional data that is further responsive to the request is received prior to expiration of the second request timer, update the first request timeout value based upon an amount of time between sending of the request and receiving of the data that is responsive to the request, wherein updating the first request timeout value generates a first updated request timeout value; and
   upon sending a subsequent request for data to the external device, start the first request timer using the first updated request timeout value, the first updated request timeout value specifying a maximum amount of time to wait for receiving data sent from the external device that is responsive to the subsequent request.

2. The non-transitory computer-readable storage medium of claim 1, further encoded with instructions that, when executed, cause the one or more processors to:
   when the additional data that is further responsive to the request is received prior to expiration of the second request timer, update the second request timeout value based upon an amount of time between receiving the data that is responsive to the request and receiving the additional data that is further responsive to the request, wherein updating the second request timeout value generates a second updated request timeout value.

3. The non-transitory computer-readable storage medium of claim 2, further encoded with instructions that, when executed, cause the one or more processors to:
   when the data responsive to the subsequent request is received prior to expiration of the first request timer, start the second request timer using the second updated request timeout value, the second updated request timeout value specifying a maximum amount of time to wait for receiving additional data sent from the external device that is further responsive to the subsequent request.

4. The non-transitory computer-readable storage medium of claim 3, further encoded with instructions that, when executed, cause the one or more processors to:
   update the first updated request timeout value based upon an amount of time between sending the subsequent request and receiving the data that is responsive to the subsequent request; and
   update the second updated request timeout value based upon an amount of time between receiving the data that is responsive to the subsequent request and receiving the additional data that is further responsive to the subsequent request.

5. The non-transitory computer-readable storage medium of claim 1, further encoded with instructions that, when executed, cause the one or more processors to:
   when there is any additional data to be received that is further responsive to the request, re-start the second request timer using the second request timeout value; and
   when any additional data that is further responsive to the request is received prior to expiration of the second request timer, cancel the second request timer.

6. The non-transitory computer-readable storage medium of claim 5, further encoded with instructions that, when executed, cause the one or more processors to:
   iteratively repeat the re-starting of the second request timer if there is any additional data to be received that is further responsive to the request, and the cancelling of the second request timer if any additional data that is further responsive to the request is received prior to expiration of the second request timer.

7. The non-transitory computer-readable storage medium of claim 6, further encoded with instructions that, when executed, cause the one or more processors to:
   update the second request timeout value based upon a longest amount of time between receiving of any additional data that is further responsive to the request and receiving of any further additional data that is also responsive to the request.

8. The non-transitory computer-readable storage medium of claim 1, further encoded with instructions that, when executed, cause the one or more processors to:
   when the data responsive to the request is not received prior to expiration of the first request timer, or when the additional data further responsive to the request is not received prior to expiration of the second request timer, abort andre-send the request.

9. The non-transitory computer-readable storage medium of claim 1, further encoded with instructions that, when executed, cause the one or more processors to:
   receive an initial value of the first request timeout value from the external device prior to starting the first request timer; and
   receive an initial value of the second request timeout value from the external device prior to starting the second request timer.

10. The non-transitory computer-readable storage medium of claim 1, wherein the request comprises an HTTP (Hypertext Transfer Protocol) or HTTPS (Hypertext Transfer Protocol Secure) request, wherein a web application initiates the request via an Extensible Markup Language (XML) object, and wherein the external device comprises a web server.

11. The non-transitory computer-readable storage medium of claim 1, further encoded with instructions that, when executed, cause the one or more processors to:
   when the data responsive to the request is received prior to expiration of the first request timer, cancel the first request timer; and
   when the additional data further responsive to the request is received prior to expiration of the second request timer, cancel the second request timer.

12. A method comprising:
   upon sending a request for data to an external device, starting, by a computing device, a first request timer using a first request timeout value, the first request timeout value specifying a maximum amount of time to wait for receiving data sent from the external device that is responsive to the request;

when the data responsive to the request is received prior to expiration of the first request timer, starting, by the computing device, a second request timer using a second request timeout value, the second request timeout value specifying a maximum amount of time to wait for receiving additional data sent from the external device that is further responsive to the request;

when the additional data that is further responsive to the request is received prior to expiration of the second request timer, updating, by the computing device, the first request timeout value based upon an amount of time between sending of the request and receiving of the data that is responsive to the request, wherein updating the first request timeout value generates a first updated request timeout value; and upon sending a subsequent request for data to the external device, starting, by the computing device, the first request timer using the first updated request timeout value, the first updated request timeout value specifying a maximum amount of time to wait for receiving data sent from the external device that is responsive to the subsequent request.

13. A method comprising:

sending, from a computing device to an external device, a request for data initiated by a web application;

determining, by the computing device, a type of the request that is indicative of a type of action that is to be performed by the external device in responding to the request;

starting, by the computing device, a first request timer using a first request timeout value, the first request timeout value specifying a maximum amount of time to wait for receiving data sent from the external device that is responsive to the request, wherein the first request timeout value is adjusted based upon the type of the request prior to starting the first request timer;

when data responsive to the request is received prior to expiration of the first request timer, starting, by the computing device, a second request timer using a second request timeout value, the second request timeout value specifying a maximum amount of time to wait for receiving additional data sent from the external device that is further responsive to the request; and determining, by the computing device, whether the request is unsuccessful based upon expiration of the first request timer or the second request timer.

14. A computing device, comprising:

one or more processors; and one or more modules operable by the one or more processors to:

upon sending a request for data to an external device, start a first request timer using a first request timeout value, the first request timeout value specifying a maximum amount of time to wait for receiving data sent from the external device that is responsive to the request;

when the data responsive to the request is received prior to expiration of the first request timer, start a second request timer using a second request timeout value, the second request timeout value specifying a maximum amount of time to wait for receiving additional data sent from the external device that is further responsive to the request;

when the additional data that is further responsive to the request is received prior to expiration of the second request timer, update the first request timeout value based upon an amount of time between sending of the request and receiving of the data that is responsive to the request, wherein updating the first request timeout value generates a first updated request timeout value; and upon sending a subsequent request for data to the external device, start the first request timer using the first updated request timeout value, the first updated request timeout value specifying a maximum amount of time to wait for receiving data sent from the external device that is responsive to the subsequent request.

15. The computing device of claim 14, wherein the one or more modules are further operable by the one or more processors to:

when the additional data that is further responsive to the request is received prior to expiration of the second request timer, update the second request timeout value based upon an amount of time between receiving the data that is responsive to the request and receiving the additional data that is further responsive to the request, wherein updating the second request timeout value generates a second updated request timeout value.

16. The computing device of claim 15, wherein the one or more modules are further operable by the one or more processors to:

when the data responsive to the subsequent request is received prior to expiration of the first request timer, start the second request timer using the second updated request timeout value, the second updated request timeout value specifying a maximum amount of time to wait for receiving additional data sent from the external device that is further responsive to the subsequent request.

17. The computing device of claim 16, wherein the one or more modules are further operable by the one or more processors to:

update the first updated request timeout value based upon an amount of time between sending the subsequent request and receiving the data that is responsive to the subsequent request; and update the second updated request timeout value based upon an amount of time between receiving the data that is responsive to the subsequent request and receiving the additional data that is further responsive to the subsequent request.

18. The computing device of claim 14, wherein the one or more modules are further operable by the one or more processors to:

when there is any additional data to be received that is further responsive to the request, re-start the second request timer using the second request timeout value; and when any additional data that is further responsive to the request is received prior to expiration of the second request timer, cancel the second request timer.

19. The computing device of claim 18, wherein the one or more modules are further operable by the one or more processors to iteratively repeat the starting of the second request timer if there is any additional data to be received that is further responsive to the request, and the cancelling of the second request timer if any additional data that is further responsive to the request is received prior to expiration of the second request timer.

20. The computing device of claim 19, wherein the one or more modules are further operable by the one or more processors to:

update the second request timeout value based upon a longest amount of time between receiving of any additional data that is further responsive to the request and receiving of any further additional data that is also responsive to the request.

21. The computing device of claim 14, wherein the one or more modules are further operable by the one or more processors to abort the request when the data responsive to the request is not received prior to expiration of the first request timer or when the additional data further responsive to the request is not received prior to expiration of the second request timer.

22. The computing device of claim 14, wherein the one or more modules are further operable by the one or more processors to:
    receive an initial value of the first request timeout value from the external device prior to starting the first request timer; and
    receive an initial value of the second request timeout value from the external device prior to starting the second request timer.

23. The computing device of claim 14, wherein the request comprises an HTTP (Hypertext Transfer Protocol) or HTTPS (Hypertext Transfer Protocol Secure) request, wherein a web application initiates the request via an Extensible Markup Language (XML) object, and wherein the external device comprises a web server.

24. The computing device of claim 14, wherein the one or more modules are further operable by the one or more processors to:
    when the data responsive to the request is received prior to expiration of the first request timer, cancel the first request timer; and
    when the additional data further responsive to the request is received prior to expiration of the second request timer, cancel the second request timer.

25. A computing device, comprising:
    one or more processors; and
    one or more modules operable by the one or more processors to:
        send, to an external device, a request for data initiated by a web application;
        determine a type of the request that is indicative of a type of action that is to be performed by the external device in responding to the request;
        start a first request timer using a first request timeout value, the first request timeout value specifying a maximum amount of time to wait for receiving data sent from the external device that is responsive to the request, wherein the first request timeout value is adjusted based upon the type of the request prior to starting the first request timer;
        when data responsive to the request is received prior to expiration of the first request timer, start a second request timer using a second request timeout value, the second request timeout value specifying a maximum amount of time to wait for receiving additional data sent from the external device that is further responsive to the request; and
        determine whether the request is unsuccessful based upon expiration of the first request timer or the second request timer.

\* \* \* \* \*